United States Patent
Harada et al.

(10) Patent No.: US 10,958,197 B2
(45) Date of Patent: Mar. 23, 2021

(54) MOTOR DRIVE CIRCUIT, METHOD OF CONTROLLING SAME, AND STORAGE MEDIUM

(71) Applicant: CANON KABUSHIKI KAISHA, Tokyo (JP)

(72) Inventors: Keiji Harada, Yokohama (JP); Yuichi Naoi, Tokorozawa (JP); Norio Sugiyama, Fujisawa (JP); Noboru Hada, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/504,015

(22) Filed: Jul. 5, 2019

(65) Prior Publication Data

US 2020/0028458 A1   Jan. 23, 2020

(30) Foreign Application Priority Data

Jul. 20, 2018   (JP) ................. 2018-136655

(51) Int. Cl.
*H02P 7/03*       (2016.01)
*B41J 2/045*      (2006.01)
(Continued)

(52) U.S. Cl.
CPC ............ *H02P 7/04* (2016.02); *B41J 2/04541* (2013.01); *B41J 2/04586* (2013.01); *H02P 5/68* (2013.01); *H02P 7/06* (2013.01)

(58) Field of Classification Search
CPC ...... H02P 7/04; H02P 5/68; H02P 7/06; B41J 2/04541
See application file for complete search history.

(56) References Cited

U.S. PATENT DOCUMENTS 6,057,664 A  *  5/2000  Ikawa ................. H02P 5/74
                                                     318/254.2
7,508,161 B2    3/2009  Harada
(Continued)

FOREIGN PATENT DOCUMENTS

JP        2008-30466        2/2008

OTHER PUBLICATIONS

U.S. Appl. No. 16/394,095, filed Apr. 25, 2019, by Keiji Harada et al.

*Primary Examiner* — Cortez M Cook
(74) *Attorney, Agent, or Firm* — Venable LLP

(57) ABSTRACT

The technique of the present disclosure has an object to perform PWM control of DC motors with a CPU and a motor drive circuit connected by a smaller number of serial interfaces, and provides a motor drive circuit comprising: energization control units to switch the directions of energization of motors by using switching elements to be driven by PWM signals; a reception unit to receive data indicating energization of the motor and the duty ratio of the PWM signal for each energization control unit from a computation apparatus by serial communication; a first signal generation unit to generate a motor control signal for controlling energization of the motor and the duty ratio based on the data for each energization control unit; and a second signal generation unit to generate the PWM signal having the duty ratio set according to the corresponding motor control signal for each energization control unit.

16 Claims, 7 Drawing Sheets

(51) Int. Cl.
H02P 5/68 (2006.01)
H02P 7/06 (2006.01)

(56) References Cited

U.S. PATENT DOCUMENTS

| | | | |
|---|---|---|---|
| 9,195,287 B2 | 11/2015 | Harada | |
| 2010/0127652 A1* | 5/2010 | Morita | H02P 27/08 318/400.27 |
| 2012/0007529 A1* | 1/2012 | Kim | H02P 23/0004 318/400.04 |

* cited by examiner

| | Bit Number | | | | | | | | | | | | | | | | | | | | |
|---|---|---|---|---|---|---|---|---|---|---|---|---|---|---|---|---|---|---|---|---|---|
| | [MSB] 19 | 18 | 17 | 16 | 15 | 14 | 13 | 12 | 11 | 10 | 9 | 8 | 7 | 6 | 5 | 4 | 3 | 2 | 1 | 0 [LSB] | |
| CR | ADDRESS | | | | | | Don't care | | | | | | | | | | | | | | 301 |
| | ADDRESS | | | | | EN | PWM DUTY | | | | | | PWM PERIOD | | | | | PARITY | | | 311 |
| LF | ADDRESS | | | | | | Don't care | | | | | | | | | | | | | | 302 |
| | ADDRESS | | | | | EN | PWM DUTY | | | | | | PWM PERIOD | | | | | PARITY | | | 312 |
| APP | ADDRESS | | | | | | Don't care | | | | | | | | | | | | | | 303 |
| | ADDRESS | | | | | EN | PWM DUTY | | | | | | PWM PERIOD | | | | | PARITY | | | 313 |
| FB | ADDRESS | | | | | | Don't care | | | | | | | | | | | | | | 304 |
| | ADDRESS | | | | | EN | PWM DUTY | | | | | | PWM PERIOD | | | | | PARITY | | | 314 |
| COMMON | ADDRESS | | | | | | Don't care | | | | | | | EN D | EN C | EN B | EN A | PARITY | | | 315 |

FIG.4

($\oplus$ : EXCLUSIVE-OR)

MOTOR DRIVE CIRCUIT, METHOD OF CONTROLLING SAME, AND STORAGE MEDIUM

BACKGROUND OF THE INVENTION

Field of the Invention

The technique of the present disclosure relates to a technique for PWM control of DC motors.

Description of the Related Art

In conventional PWM control of a DC motor, generally, a CPU or the like firstly generates a PWM signal on the basis of necessary information, then sends the PWM signal to a motor drive circuit, and performs feedback control by means of the rotational speed and phase of the DC motor's rotor or the like. For example, in Japanese Patent Laid-Open No. 2008-30466, a CPU/gate array performs PID computation on the basis of information on the speed and position of a roller driven by a DC motor to thereby generate a PWM signal for controlling the DC motor, and transmits the PWM signal to a motor drive circuit. Further, the CPU/gate array transmits an enable signal indicating whether or not to permit energization of the motor in a case of using a PWM signal as a phase signal for setting the PWM duty (the duty ratio of the PWM signal).

For this reason, Japanese Patent Laid-Open No. 2008-30466 requires at least two signal lines between the CPU/gate array and the motor drive circuit to transmit the enable signal and the phase signal.

SUMMARY OF THE INVENTION

Here, a problem with the conventional example is that the number of signal lines between the CPU/gate array and the motor drive circuit increases in proportion to the number of DC motors to be controlled. For example, a multi-function inkjet printer or the like comprising four motors requires at least eight signal lines between its CPU/gate array and motor drive circuit.

The technique of the present disclosure provides a motor drive circuit comprising: a plurality of energization control units each configured to switch a direction of energization of a motor by using a switching element configured to be driven by a PWM signal; a reception unit configured to receive data for each of the plurality of energization control units from a computation apparatus by serial communication, the data indicating energization of the motor and a duty ratio of the PWM signal; a first signal generation unit configured to generate a motor control signal for each of the plurality of energization control units on a basis of the data, the motor control signal being a signal for controlling energization of the motor and the duty ratio; and a second signal generation unit configured to generate the PWM signal for each of the plurality of energization control units, the PWM signal having the duty ratio thereof set on a basis of the corresponding motor control signal.

Further features of the present invention will become apparent from the following description of exemplary embodiments with reference to the attached drawings.

BRIEF DESCRIPTION OF THE DRAWINGS

FIG. 4 is a diagram illustrating details of register groups in a control signal generation unit;

DESCRIPTION OF THE EMBODIMENTS

Embodiment 1

Next, an example in which the technique of the present disclosure is applied to a multi-function inkjet printer according to embodiment 1 of the present disclosure will be discussed below.

Figure 1A:
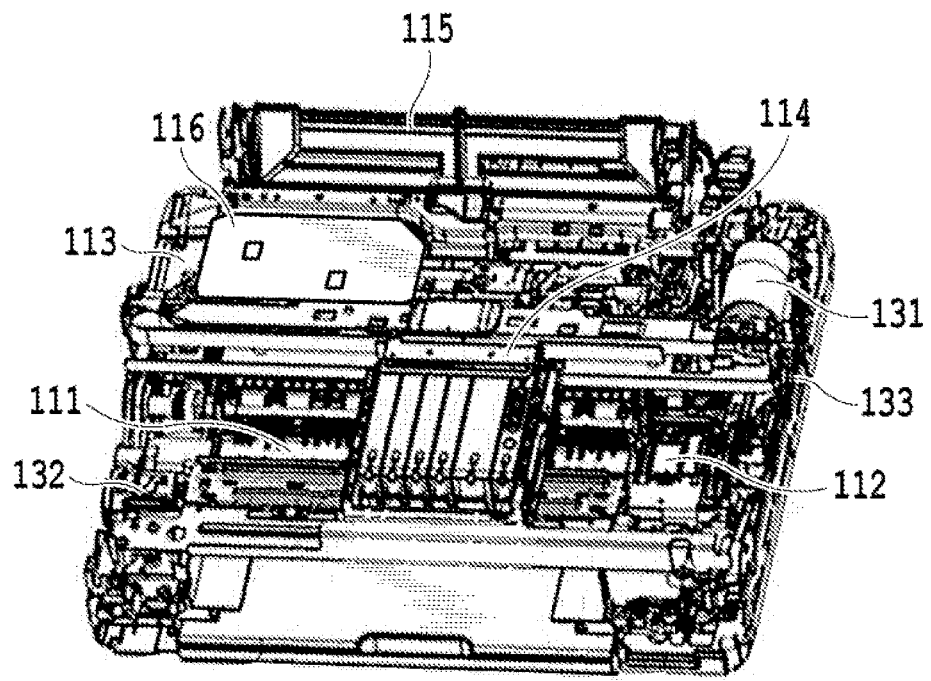
FIG. 1A is a diagram illustrating the entire configuration of a multi-function inkjet printer comprising a plurality of motors.
Figure 1B:
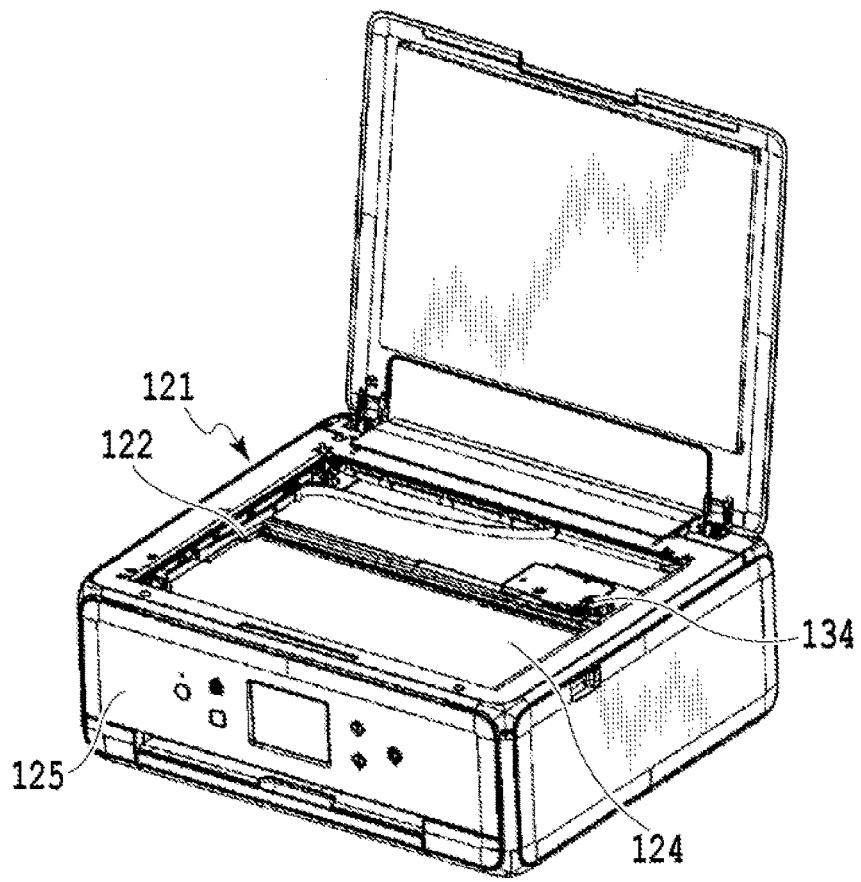
FIG. 1B is a diagram illustrating the entire configuration of the multi-function inkjet printer comprising the plurality of motors.

First, FIGS. 1A and 1B illustrate the entire configuration of a multi-function inkjet printer comprising a plurality of motors.

FIG. 1A represents a printer unit and comprises a control board 116 that controls the entire printer, the control board 116 comprising a CR motor 131, an LF motor 132, an APP motor 133, an AC adapter 113, and a later-described motor control circuit 100.

The CR motor 131 is a motor that drives a carriage 114 that conveys a print head. The LF motor 132 is a motor that drives a conveyance mechanism 111 that conveys a print medium. The APP motor 133 is a motor that drives a cleaning mechanism 112 that cleans the nozzles of the print head, and an automatic conveyance mechanism 115 that takes out only the top print medium among a plurality of print media and feeds it to the print unit.

Also, FIG. 1B illustrates the printer unit illustrated in FIG. 1A with an image reading unit 121, a panel unit 125, and so on installed thereon. The image reading unit 121 comprises an image reading sensor 122, an FB motor 134 which moves the image reading sensor 122, and a document glass plate 124 on which to place a document.

Figure 2:
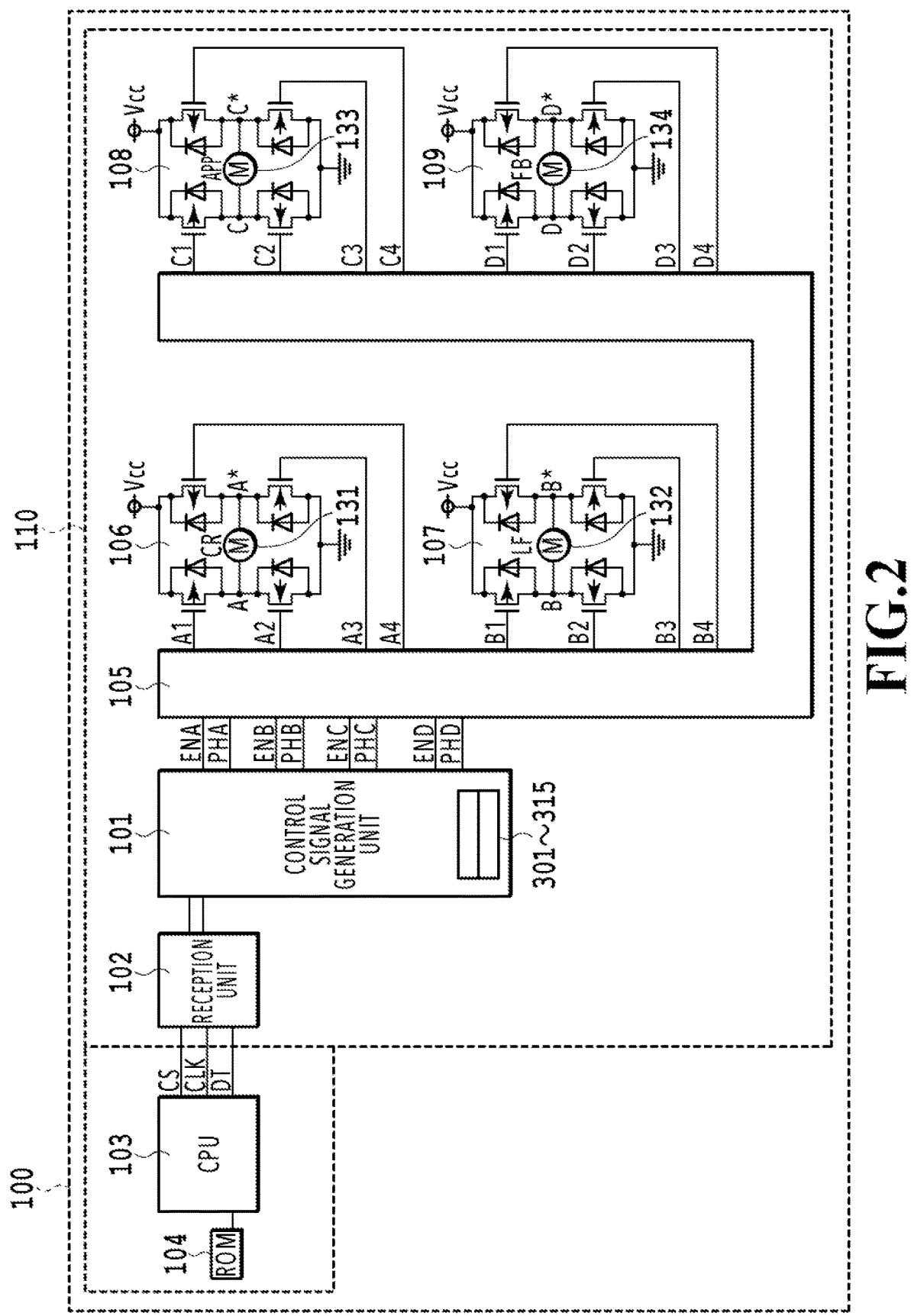
FIG. 2 is a diagram illustrating the hardware configuration of a motor control circuit.

Next, FIG. 2 illustrates details of the motor control circuit 100 according to embodiment 1 of the present disclosure. The motor control circuit 100 is implemented on the control board 116 and includes a CPU 103, an ROM 104, and a motor drive circuit 110. Further, the motor drive circuit 110 includes a serial data reception unit 102, a control signal generation unit 101, an H-bridge control unit 105, and H-bridge circuits 106 to 109. Note that FIG. 2 omits illustration of encoders for feedback of the rotational speeds or rotational phases of the DC motors' rotors, the signal lines for feedback signals, and the like.

The CPU 103 transmits signals indicating the PWM period and PWM duty for each of the CR motor 131, the LF motor 132, the APP motor 133, and the FB motor 134 and whether or not to permit energization of each of the motors to the serial data reception unit 102 on the basis of firmware written in the ROM 104. The signals transmitted from the CPU 103 to the serial data reception unit 102 includes three types of signals, namely, chip select signal CS, clock signal CLK, and data signal DT. Hence, the signal line for transferring the data signals DT is the only data signal line connecting the CPU 103 and the serial data reception unit 102. Note that although the encoders, the signal lines for feedback signals between the encoders and the CPU, and the like are not illustrated in FIG. 2, the motor control circuit 100 comprises a configuration that enables the CPU 103 to perform speed feedback control or phase feedback control in the present embodiment.

The serial data reception unit 102 has a serial interface comprising a single data signal line, through which the serial data reception unit 102 receives serial data transmitted from the CPU 103. The serial data reception unit 102 performs a later-described parity check and decodes addresses contained in the data signals DT and then writes pieces of data to corresponding register groups 301 to 304 and 311 to 315 in the control signal generation unit 101.

The control signal generation unit 101 generates two types of motor control signals, namely, enable signal (EN) and phase signal (PH), for each single motor on the basis of the pieces of data written in the register groups 301 to 304 and 311 to 315. In the present embodiment, the control signal generation unit 101 outputs enable signals ENA to END and phase signals PHA to PHD for the four motors to the H-bridge control unit 105.

On the basis of the enable signals ENA to END and the phase signals PHA to PHD, the H-bridge control unit 105 outputs PWM signals A1 to A4, B1 to B4, C1 to C4, and D1 to D4 for controlling the switching elements in the H-bridge circuits 106 to 109, respectively.

The H-bridge circuits 106 to 109 are energization control units that drive the CR motor 131, the LF motor 132, the APP motor 133, and the FB motor 134 by switching the direction of energization of the CR motor 131, the LF motor 132, the APP motor 133, and the FB motor 134, respectively. Each H-bridge circuit controls the amount and direction of current to be supplied to the corresponding motor from a power supply (power supply voltage Vcc) by using four switching elements.

Here, the serial interface protocol will be described with reference to FIG. 3. Firstly, the CPU 103, which is the transmission side, lowers the chip select signal CS from a high level to a low level to activate the serial data reception unit 102. Then, the CPU 103 outputs 20 pulses of a 20 MHz-clock signal CLK and, at the same time, sequentially outputs a data signal DT bit by bit from the most significant bit (MSB) to the least significant bit (LSB) in synchronization with the pulses. On the other hand, the serial data reception unit 102 latches the data signal DT to take in the 20-bit data from the MSB to the LSB at the falling edges of the clock signal CLK. Further, the serial data reception unit 102 performs the later-described parity check on the received data and, in a case where the parity check is passed, decodes the address contained in the data signal DT and writes the data to specified registers.

Next, FIG. 4 illustrates details of the register groups 301 to 304 and 311 to 315 in the control signal generation unit 101.

The registers 301 to 304 are PWM period setting registers for determining the PWM periods for the CR motor 131, the LF motor 132, the APP motor 133, and the FB motor 134, respectively. A desired PWM period value is written in nine bits b0 to b8 in each of these registers 301 to 304. The PWM period value is a multiple of the reference clock in the control signal generation unit 101, which is 12 MHz. In a case where the PWM period is, for example, 40 µs, the PWM period value is 40×12=480. In six bits b14 to b19, a unique value indicating an address identifying the register is written. In FIG. 4, the unique value is described simply as "ADDRESS" in the bits b14 to b19. Note that the values of bits b9 to b13 in the data signals DT for the registers 301 to 304 are not used.

The registers 311 to 314 are PWM duty setting registers for determining the PWM duties for the CR motor 131, the LF motor 132, the APP motor 133, and the FB motor 134, respectively. A desired on-time value in a PWM period is written in nine bits b4 to b12 in each of these registers 311 to 314. The on-time value is a multiple of the reference clock in the control signal generation unit 101, which is 12 MHz. In a case where the on-time value is, for example, 20 µs, the on-time value is 20×12=240. A value indicating whether or not to permit energization is written in a bit b13, and the address is written in bits b14 to b19.

Further, parity check data is written in bits b0 to b3. This parity check data is used to verify whether or not a serial signal sent from the CPU 103 has properly reached the serial data reception unit 102 without data corruption along the way by using the following method.

Figures 5A, 5B:
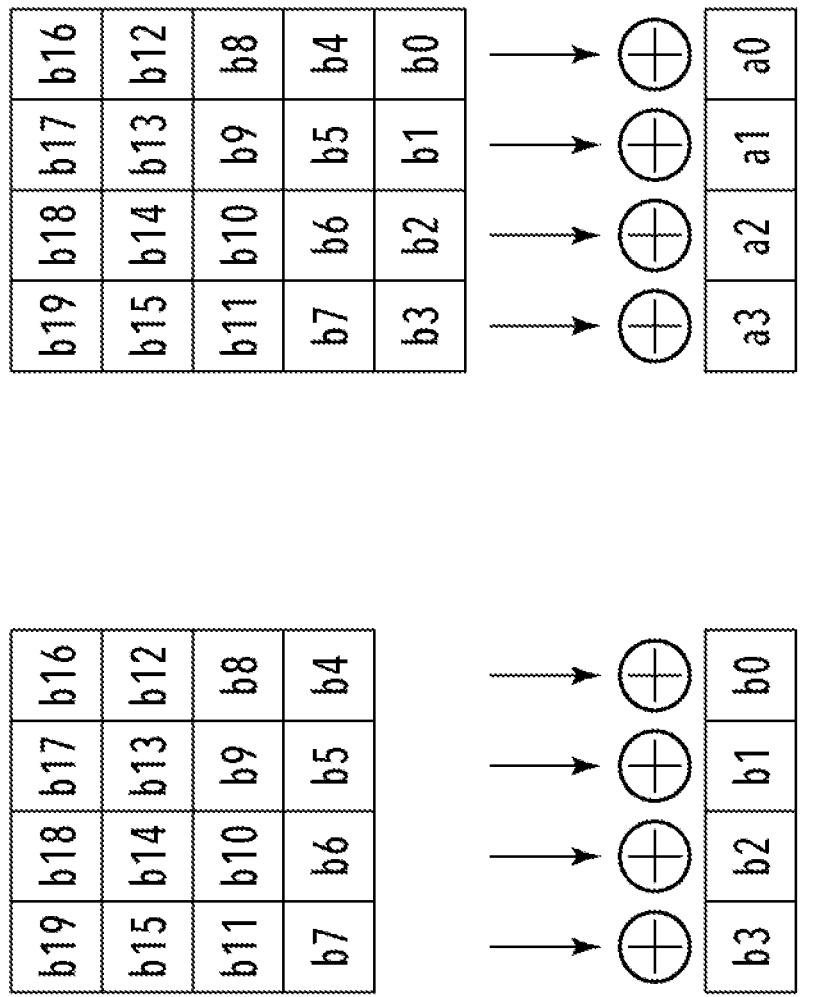
FIG. 5A is a diagram illustrating a method of generating parity check data.
FIG. 5B is a diagram explaining a parity check method.

FIGS. 5A and 5B illustrates diagrams explaining a method of generating the parity check data and a data check method using it. Firstly, the CPU 103 performs the process illustrated in FIG. 5A on the 16-bit data written in the bits b4 to b19 in each of the registers 311 to 315 to generate 4-bit parity check data (parity bit) to be written to the bits b0 to b3 in each of the registers 311 to 315. Specifically, the CPU 103 obtains the exclusive-or of the bits b16, b12, b8, and b4 as b0 and the exclusive-or of the bits b17, b13, b9, and b5 as b1. Similarly, the CPU 103 obtains the exclusive-or of the bits b18, b14, b10, and b6 as b2 and the exclusive-or of the bits b19, b15, b11, and b7 as b3. The CPU 103 generates the check data in the above manner and transfers it to the bits b0 to b3 in the registers 311 to 315 in the control signal generation unit 101 through the serial data reception unit 102.

Then, the control signal generation unit 101 performs a parity check by performing the process illustrated in FIG. 5B on each received 20-bit data signal DT. Specifically, the CPU 103 obtains the exclusive-or of the bits b16, b12, b8, b4, and b0 as a0 and the exclusive-or of the bits b17, b13, b9, b5, and b1 as a1. Similarly, the CPU 103 obtains the exclusive-or of b18, b14, b10, b6, and b2 as a2 and the exclusive-or of b19, b15, b11, b7, and b3 as a3. Further, the CPU 103 obtains the exclusive-or of the above four computation results a0 to a3. In a case where the result is 0, the parity check is passed, and the CPU 103 stores the data signal DT with the transferred bits b0 to b19 in the register specified by the address. On the other hand, in a case where the exclusive-or of a0 to a3 is 1, the parity check is failed, and the CPU 103 does not store the signal data DT with the transferred bits b0 to b19 in any the register but discards it.

Note that the purpose of the parity check is to prevent an erroneous operation of the motor due to failure to properly transfer of the data signal DT caused by distortion of the serial interface waveform by noise or the like. In the present embodiment, the parity check is performed only on the data signals DT for the PWM duty setting registers 311 to 314 and the later-described register 315, which are frequently accessed during motor operations. For this reason, the data signals DT for the PWM period setting registers 301 to 304, which only need to be set only once in the initial phase of operation, does not contain parity check data and is not subjected to the parity check.

The register 315 is a multiple-motor simultaneous stop register for simultaneously stopping the plurality of motors through a single serial communication, and is used in cases where the plurality of motors need to be immediately stopped, such as a case where an error occurs. Since the parity check is performed also on the data signal DT for the register 315, as mentioned above, parity check data is outputted to the bits b0 to b3 in the register 315. Values indicating whether or not to permit energization of the CR motor 131, the LF motor 132, the APP motor 133, and the FB motor 134 are outputted to the bits b4 to b7, respectively. Moreover, the address is written in the bits b14 to 19. Note that the values of the bits b8 to b13 are not used in the data signal DT for the register 315.

Then, the control signal generation unit 101 generates the enable signals ENA to END and the phase signals PHA to PHD on the basis of the pieces of data stored in the registers 301 to 304 and 311 to 315 and outputs them to the H-bridge control circuit 105, as illustrated in FIG. 2.

The signals ENA to END are enable signals for controlling whether or not to permit energization of the CR motor 131, the LF motor 132, the APP motor 133, and the FB motor 134, respectively. These enable signals ENA to END are generated by the control signal generation unit 101 on the basis of the values stored in the bits b13 in the respective registers 311 to 314. The values indicate whether or not to permit energization. Each of the enable signals ENA to END is at one of two output voltage levels, and is controlled to be at the high level to permit energization and at the low level to not permit energization. The H-bridge control unit 105 outputs PWM signals to the H-bridge circuits 106 to 109 only in a case where the voltage levels of the respective enable signals EN are the high level.

The signals PHA to PHD are phase signals for controlling the PWM duties for the CR motor 131, the LF motor 132, the APP motor 133, and the FB motor 134, respectively. These phase signals PHA to PHD are generated by the control signal generation unit 101 on the basis of the PWM periods stored in the bits b0 to b8 in the respective registers 301 to 304 and the PWM duties stored in the bits b4 to b12 in the respective registers 311 to 314. Note that the PWM duties mentioned here refer to the ratios of the on-times to the PWM periods of the phase signals PHA to PHD, as mentioned earlier.

Figure 6:
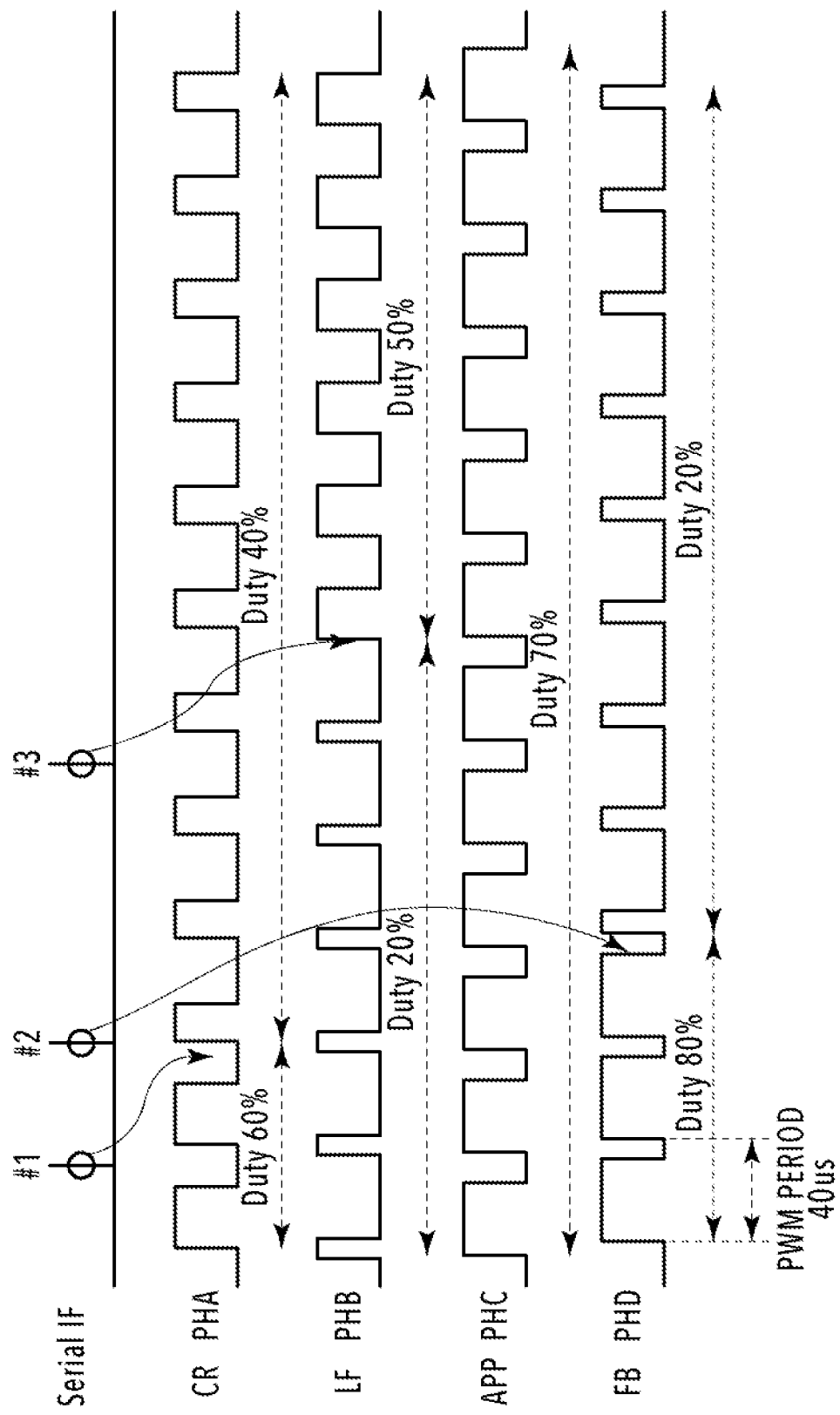
FIG. 6 is a diagram illustrating how a CPU changes the PWM duties of motor control signals with a serial interface.

Next, FIG. 6 illustrates how the CPU 103 changes the PWM duties of motor control signals through the serial interface. A serial data signal SERIAL IF in FIG. 6 is a simplified representation of the three types of signals in FIG. 3, namely, the chip select signal CS, the clock signal CLK, and the data signals DT. Also, each point on the serial data signal SERIAL IF with a bold vertical line illustrated in FIG. 6 indicates that a serial communication to transmit the above three types of signals is performed once. In the example illustrated in FIG. 6, there are SERIAL IF #1 to #3, so that a serial communication is performed three times. In the serial communication SERIAL IF #1, the PWM duty of the phase signal PHA for the CR motor 131 is changed from 60% to 40%. Similarly, in SERIAL IF #2, the PWM duty of the phase signal PHD for the FB motor 134 is changed from 80% to 20%. In SERIAL IF #3, the PWM duty of the phase signal PHB for the LF motor 133 is changed from 20% to 50%.

Meanwhile, setting the PWM duty of the phase signal PHB to 50% is equivalent to bringing the motor's forward rotational force and backward rotational force into equilibrium, that is, stopping the rotation. In addition to this, the forward or backward rotational force may be finely adjusted by setting the PWM duty of the phase signal PHB to, for example, 49% or 51% on the basis of the state of the rotation. Such fine adjustment enables highly accurate stop control and super-slow control.

In the technique of the present disclosure, main processes added as compared to conventional parallel communication methods include the process of serially transferring each data signal DT between the CPU and the motor drive circuit, and the process of receiving the data signal DT at the motor drive circuit 110. This reception process includes processes such as serial-parallel conversion, the parity check, the address decoding, and the data write to the corresponding register.

Figure 3:
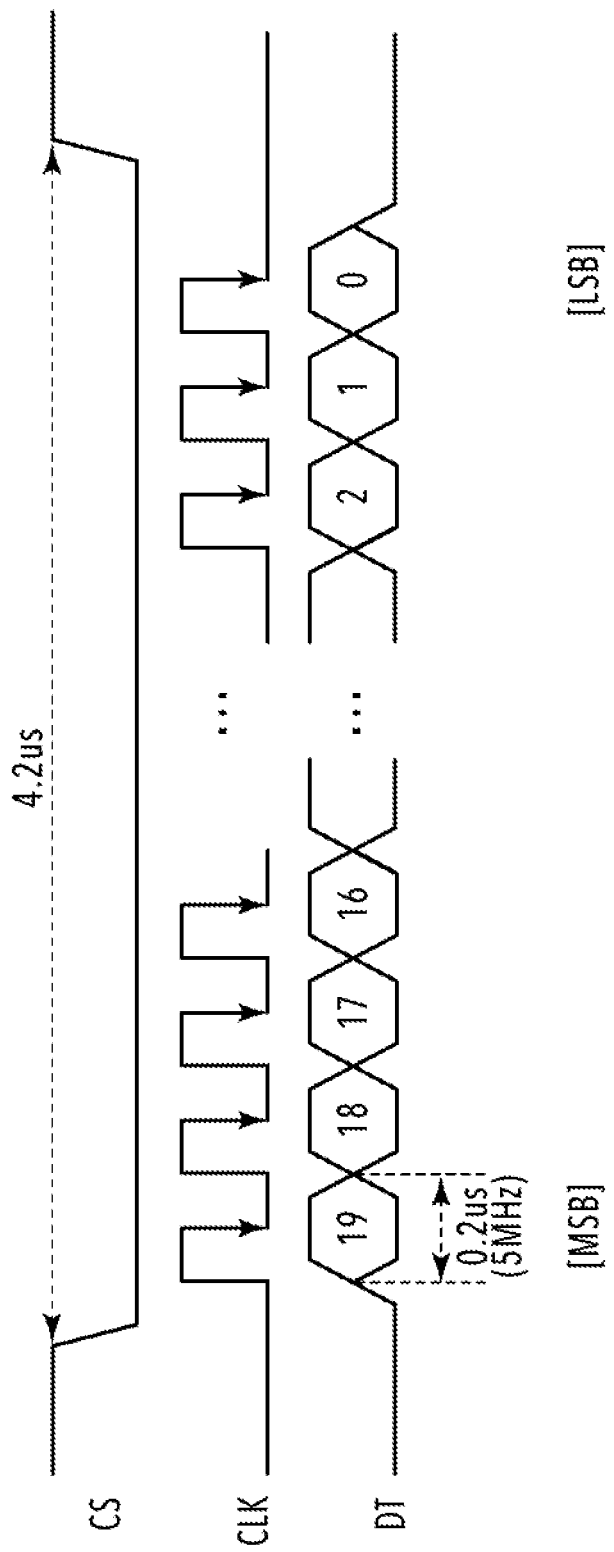
FIG. 3 is a diagram explaining a serial interface protocol.

The time taken for the serial transfer process between the CPU and the motor drive circuit is approximately 4.2 µs in a case where the clock frequency is 5 MHz and a single packet contains 20 bits, as illustrated in FIG. 3. On the other hand, the time taken for the reception process at the motor drive circuit 110 is in the order of 10 ns since the process only involves latching the data signal DT with the high-speed clock in the motor drive circuit 110. Thus, in the technique of the present disclosure, the increase in processing time as compared to conventional methods is substantially the time taken for the serial transfer process. Note that the time taken to read out the data in the register and generate the enable signals and the phase signals is also significantly shorter than the time taken for the serial transfer process, and can be considered substantially zero.

Here, the period for speed adjustment of each DC motor (servo period) is about 1 ms. Thus, in the case where the servo period for each motor is, for example, 1 ms, it is possible to perform speed adjustment in each single period by performing the serial transfer process, which takes about 4.2 µs, once within this 1 ms. In other words, in a case where the data transfer bandwidth of the serial interface is 5 Mb/s, the packet length for setting the PWM duty is 20 bits, and the period for adjusting the speed of a DC motor is 1 ms, it is possible to perform PWM control of 200 DC motors or more. Considering the above, the amount of processing time increased by the technique of the present disclosure is so low that its impact on the speed adjustment of the DC motors is negligible. Note that it is possible to further reduce the impact by raising the clock frequency to widen the data transfer bandwidth.

As described above, although the increase in processing load due to the implementation of the control signal generation unit 101 in the motor drive circuit 110 and the use of serial communication for the data transfer between the CPU and the motor drive circuit is not zero, its impact is negligible. Thus, it is possible to perform PWM control of the drive of the plurality of motors with the CPU and the motor drive circuit connected by a single serial interface comprising a single data signal line. Note that the number of serial interfaces between the CPU and the motor drive circuit does not necessarily have to be one.

Embodiment 2

Figure 7:
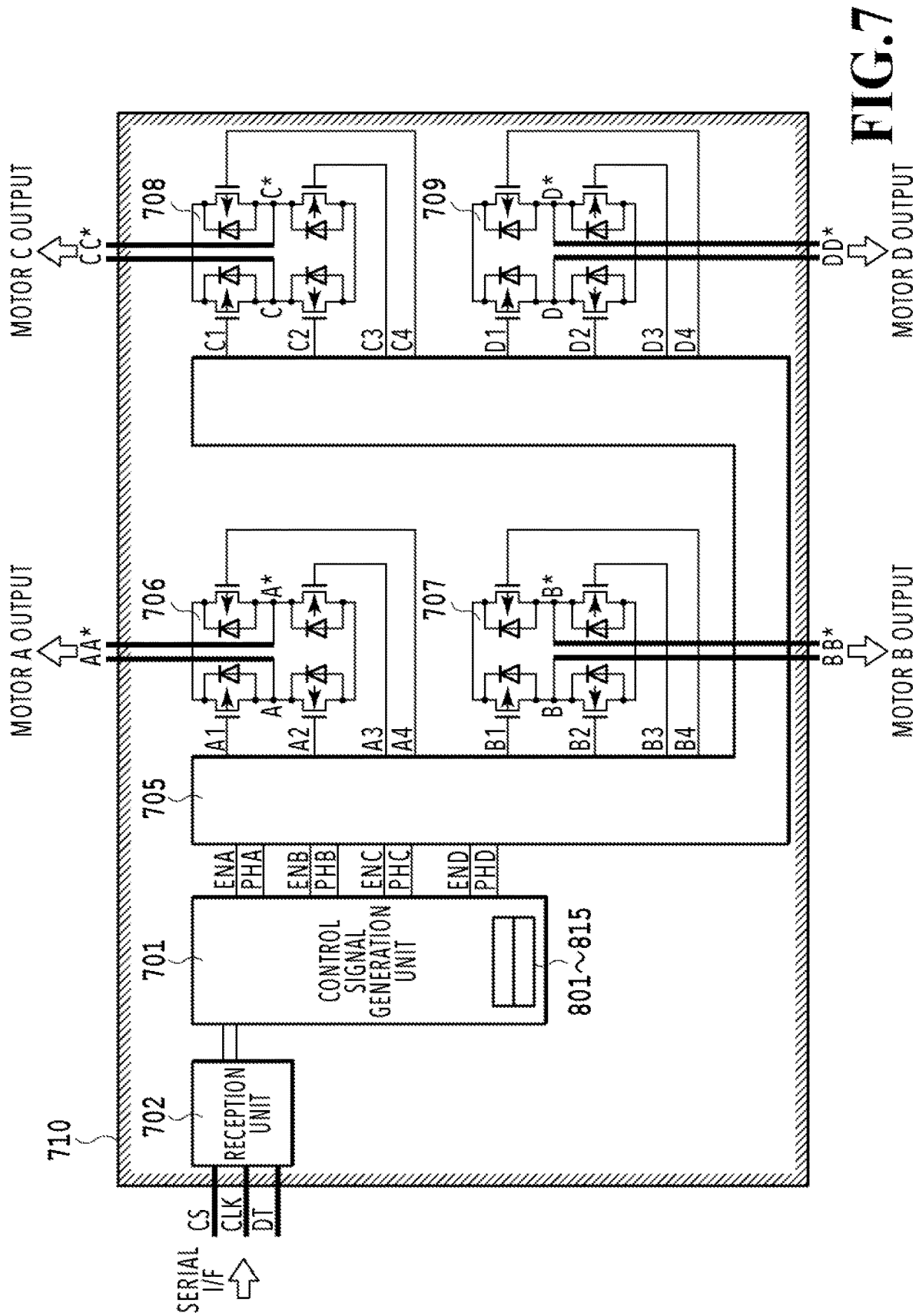
FIG. 7 is a diagram illustrating an example of a motor drive circuit constructed as a semiconductor integrated circuit.

Embodiment 2 of the present disclosure represents a motor drive circuit 710 constructed as a semiconductor integrated circuit by removing the DC motors in the motor drive circuit 110 illustrated in FIG. 2. FIG. 7 illustrates an example of that motor drive circuit. Specifically, it is a motor drive circuit comprising a serial data reception unit 702, a control signal generation unit 701, registers 801 to 804 and 811 to 815, an H-bridge control unit 705, and H-bridge circuits 706 to 709. The functions and operations of these constituent elements are similar to the functions and operations of those illustrated in FIG. 2, and description thereof is therefore omitted here.

The motor drive circuit 710 is a semiconductor integrated circuit comprising at least a chip select terminal CS, a clock terminal CLK, and a data terminal DT as a serial interface, and four DC motor output terminals A-A*, B-B*, C-C*, and D-D*. Note that FIG. 7 omits illustration of accompanying circuit terminals such as those for the power supplies and GNDs of the H-bridge circuits 706 to 709.

Meanwhile, this semiconductor integrated circuit can be constructed as a complex integrated circuit by adding thereto a so-called buck converter circuit for generating a DC power supply necessary for the inkjet printer in embodiment 1, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

With the technique of the present disclosure, it is possible to perform PWM control of a plurality of DC motors with a CPU and a motor drive circuit connected by a smaller number of serial interfaces.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-136655, filed Jul. 20, 2018, which is hereby incorporated by reference herein in its entirety.

What is claimed is:

1. A motor drive circuit that comprises a plurality of energization control units each configured to switch a direction of energization of a motor by using a switching element configured to be driven by a PWM signal, comprising:
   a reception unit configured to receive data for each of the plurality of energization control units from a computation apparatus by serial communication, the data including a value indicating whether or not to energize the motor and a duty ratio of the PWM signal;
   a first signal generation unit configured to generate a motor control signal for each of the plurality of energization control units on a basis of the data, the motor control signal including a signal for controlling whether or not to energize the motor and a signal for controlling the duty ratio of the PWM; and
   a second signal generation unit configured to generate the PWM signal for each of the plurality of energization control units, the PWM signal having the duty ratio thereof set on a basis of the corresponding motor control signal.

2. The motor drive circuit according to claim 1, wherein the first signal generation unit includes a register associated with at least one of the plurality of energization control units,
   the data includes a packet associated with at least one of the plurality of energization control units,
   the reception unit stores the packet in the register associated with the corresponding energization control unit; and
   the first signal generation unit generates the motor control signal on a basis of data of the packet stored in the register.

3. The motor drive circuit according to claim 2, wherein the reception unit stores the packets containing pieces of data for controlling energization of the motors for all of the plurality of energization control units, in the registers associated with all of the plurality of energization control units, and
   the first signal generation unit generates the motor control signals for all of the plurality of energization control units on a basis of the pieces of data in the packets stored in the registers associated with all of the plurality of energization control units.

4. The motor drive circuit according to claim 2, wherein the packet contains data of an address associated with the corresponding register, and
   the reception unit stores the packet in the corresponding register on a basis of the data of the address.

5. The motor drive circuit according to claim 2, wherein the packet contains a parity bit, and
   the reception unit stores the packet in the register only in a case where a parity check based on the parity bit is passed.

6. A printing apparatus comprising the motor drive circuit according to claim 1.

7. A method of controlling a motor drive circuit comprising a plurality of energization control units each configured to switch a direction of energization of a motor by using a switching element configured to be driven by a PWM signal, the method comprising:
   receiving data for each of the plurality of energization control units from a computation apparatus by serial communication, the data including a value indicating whether or not to energize the motor and a duty ratio of the PWM signal;
   generating a motor control signal for each of the plurality of energization control units on a basis of the data, the motor control signal including a signal for controlling whether or not to energize the motor and a signal for controlling the duty ratio of the PWM; and generating the PWM signal for each of the plurality of energization control units, the PWM signal having the duty ratio thereof set on a basis of the corresponding motor control signal.

8. The method according to claim 7, wherein
a register associated with at least one of the plurality of energization control units is included the motor drive circuit,
the data includes a packet associated with at least one of the plurality of energization control units,
the packet is stored in the register associated with the corresponding energization control unit; and
the motor control signal is generated on a basis of data of the packet stored in the register.

9. The method according to claim 7, wherein
the packets containing pieces of data for controlling energization of the motors for all of the plurality of energization control units are stored in the registers associated with all of the plurality of energization control units, and
the motor control signals for all of the plurality of energization control units are generated on a basis of the pieces of data in the packets stored in the registers associated with all of the plurality of energization control units.

10. The method according to claim 8, wherein
the packet contains data of an address associated with the corresponding register, and
the packet is stored in the corresponding register on a basis of the data of the address.

11. The method according to claim 8, wherein
the packet contains a parity bit, and
the packet is stored in the register only in a case where a parity check based on the parity bit is passed.

12. A non-transitory computer readable storage medium storing a program which causes a computer to execute a method of controlling a motor drive circuit comprising a plurality of energization control units each configured to switch a direction of energization of a motor by using a switching element configured to be driven by a PWM signal, the program comprising code to execute:
receiving data for each of the plurality of energization control units from a computation apparatus by serial communication, the data including a value indicating whether or not to energize the motor and a duty ratio of the PWM signal;
generating a motor control signal for each of the plurality of energization control units on a basis of the data, the motor control signal including a signal for controlling whether or not to energize of the motor and a signal for controlling the duty ratio of the PWM; and
generating the PWM signal for each of the plurality of energization control units, the PWM signal having the duty ratio thereof set on a basis of the corresponding motor control signal.

13. The non-transitory computer readable storage medium according to claim 12, wherein
a register associated with at least one of the plurality of energization control units is included the motor drive circuit,
the data includes a packet associated with at least one of the plurality of energization control units,
the packet is stored in the register associated with the corresponding energization control unit; and
the motor control signal is generated on a basis of data of the packet stored in the register.

14. The non-transitory computer readable storage medium according to claim 13, wherein
the packets containing pieces of data for controlling energization of the motors for all of the plurality of energization control units are stored in the registers associated with all of the plurality of energization control units, and
the motor control signals for all of the plurality of energization control units are generated on a basis of the pieces of data in the packets stored in the registers associated with all of the plurality of energization control units.

15. The non-transitory computer readable storage medium according to claim 13, wherein
the packet contains data of an address associated with the corresponding register, and
the packet is stored in the corresponding register on a basis of the data of the address.

16. The non-transitory computer readable storage medium according to claim 13, wherein
the packet contains a parity bit, and
the packet is stored in the register only in a case where a parity check based on the parity bit is passed.

* * * * *